United States Patent
Fillinger

(10) Patent No.: US 12,380,451 B1
(45) Date of Patent: *Aug. 5, 2025

(54) BIOMETRIC AUTHENTICATION ON PUSH NOTIFICATION

(71) Applicant: United Services Automobile Association (USAA), San Antonio, TX (US)

(72) Inventor: Ryan Fillinger, Prosper, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,086

(22) Filed: Sep. 21, 2023

Related U.S. Application Data

(63) Continuation of application No. 17/230,638, filed on Apr. 14, 2021, now Pat. No. 11,775,971, which is a continuation of application No. 15/277,768, filed on Sep. 27, 2016, now Pat. No. 11,010,763.

(51) Int. Cl.
| | |
|---|---|
| *G06Q 20/40* | (2012.01) |
| *G06F 21/32* | (2013.01) |
| *G06V 40/70* | (2022.01) |
| *H04L 9/40* | (2022.01) |
| *H04W 12/06* | (2021.01) |

(52) U.S. Cl.
CPC ....... *G06Q 20/40145* (2013.01); *G06F 21/32* (2013.01); *G06V 40/70* (2022.01); *H04L 63/0861* (2013.01); *H04W 12/06* (2013.01)

(58) Field of Classification Search
None
See application file for complete search history.

(56) References Cited

U.S. PATENT DOCUMENTS

| | | |
|---|---|---|
| 9,111,085 B1 | 8/2015 | Darmour et al. |
| 9,294,476 B1 | 3/2016 | Lurey et al. |
| 9,659,164 B2 | 5/2017 | Krishnamurthi |
| 9,692,752 B2 | 6/2017 | Keys |

(Continued)

FOREIGN PATENT DOCUMENTS

| | | |
|---|---|---|
| CA | 2970483 A1 | 6/2014 |
| CA | 2969094 C | 3/2018 |
| CA | 2969095 C | 6/2018 |

OTHER PUBLICATIONS

Kat King, What is a Push Notification?, Twilio, https://www.twilio.com/docs/glossary/what-is-push-notification; 3pgs.

(Continued)

*Primary Examiner* — Ayal I. Sharon
(74) *Attorney, Agent, or Firm* — Fletcher Yoder, P.C.

(57) ABSTRACT

Methods, systems, and apparatus, including computer programs encoded on a computer storage medium, for transmitting push notification data to a computing device, the push notification data being processable by the computing device to display a push notification, receiving biometric data, the biometric data being provided from user input responsive to the push notification, determining that a user providing the user input is authenticated at least partially based on the biometric data, and inducing execution of a transaction in response to determining that the user is authenticated.

18 Claims, 5 Drawing Sheets

(56) References Cited

U.S. PATENT DOCUMENTS

| | | |
|---|---|---|
| 9,741,026 B1 | 8/2017 | Grassadonia et al. |
| 9,801,066 B1 | 10/2017 | Hanley et al. |
| 9,826,055 B2 | 11/2017 | Zhang et al. |
| 9,953,231 B1 | 4/2018 | Medina, III et al. |
| 10,003,686 B2 * | 6/2018 | Jones-McFadden ........................ G06Q 20/3224 |
| 10,009,340 B2 | 6/2018 | Redberg |
| 10,034,174 B1 | 7/2018 | Tuomikoski et al. |
| 10,043,185 B2 | 8/2018 | Van Os et al. |
| 10,142,464 B1 | 11/2018 | Cairns et al. |
| 10,467,615 B1 | 11/2019 | Omojola et al. |
| 10,489,789 B1 * | 11/2019 | Gerling-Ospina ...... H04L 67/55 |
| 10,652,739 B1 | 5/2020 | Lilley et al. |
| 10,754,518 B1 * | 8/2020 | Bell .......................... H04W 4/23 |
| 10,826,886 B2 | 11/2020 | Pattar et al. |
| 10,855,842 B1 | 12/2020 | Pace, Jr. et al. |
| 10,885,510 B2 | 1/2021 | Yarbrough et al. |
| 11,010,763 B1 * | 5/2021 | Fillinger .......... G06Q 20/40145 |
| 11,270,314 B2 | 3/2022 | Gerling-Ospina et al. |
| 11,328,351 B2 * | 5/2022 | Sarir ...................... G06F 21/32 |
| 11,775,971 B1 * | 10/2023 | Fillinger ............. H04L 63/0861 705/44 |
| 12,051,075 B2 * | 7/2024 | Gerling-Ospina ........................ G06F 3/04817 |
| 2005/0030151 A1 | 2/2005 | Singh |
| 2011/0243553 A1 | 10/2011 | Russell |
| 2012/0054826 A1 | 3/2012 | Asim et al. |
| 2012/0210415 A1 | 8/2012 | Somani et al. |
| 2013/0276785 A1 | 10/2013 | Melker et al. |
| 2014/0136414 A1 | 5/2014 | Abhyanker |
| 2014/0189808 A1 | 7/2014 | Mahaffey et al. |
| 2014/0279514 A1 | 9/2014 | Sharp |
| 2014/0289117 A1 | 9/2014 | Baghdasaryan |
| 2014/0289528 A1 | 9/2014 | Baghdasaryan |
| 2014/0289833 A1 | 9/2014 | Briceno et al. |
| 2014/0337243 A1 | 11/2014 | Dutt et al. |
| 2014/0380445 A1 | 12/2014 | Tunnell et al. |
| 2015/0046990 A1 | 2/2015 | Oberheide et al. |
| 2015/0067819 A1 | 3/2015 | Shribman et al. |
| 2015/0073987 A1 | 3/2015 | Dutt |
| 2015/0088624 A1 | 3/2015 | Frederick et al. |
| 2015/0097961 A1 * | 4/2015 | Ure .......................... H04Q 9/00 348/159 |
| 2015/0120549 A1 | 4/2015 | Khalid et al. |
| 2015/0143496 A1 | 5/2015 | Thomas et al. |
| 2015/0161608 A1 | 6/2015 | Gilbert et al. |
| 2015/0189620 A1 * | 7/2015 | Metral ..................... H04W 4/02 709/206 |
| 2015/0212722 A1 | 7/2015 | Leung et al. |
| 2015/0221149 A1 | 8/2015 | Main et al. |
| 2015/0223705 A1 | 8/2015 | Sadhu |
| 2015/0227923 A1 | 8/2015 | Kutsch et al. |
| 2015/0235017 A1 | 8/2015 | Oberheide et al. |
| 2015/0278805 A1 | 10/2015 | Spencer, III et al. |
| 2015/0294313 A1 | 10/2015 | Kamal et al. |
| 2015/0310469 A1 | 10/2015 | Bemmel et al. |
| 2015/0339696 A1 | 11/2015 | Zhou et al. |
| 2015/0350143 A1 | 12/2015 | Yang et al. |
| 2015/0351075 A1 | 12/2015 | Korver et al. |
| 2015/0371260 A1 | 12/2015 | Chan et al. |
| 2016/0012433 A1 | 1/2016 | Marenick |
| 2016/0019539 A1 | 1/2016 | Hoyos et al. |
| 2016/0078430 A1 | 3/2016 | Douglas et al. |
| 2016/0086176 A1 | 3/2016 | Silva Pinto et al. |
| 2016/0140550 A1 | 5/2016 | Keys |
| 2016/0162900 A1 | 6/2016 | Dutt et al. |
| 2016/0189137 A1 | 6/2016 | Zhou et al. |
| 2016/0224774 A1 | 8/2016 | Pender |
| 2016/0241553 A1 | 8/2016 | Kim |
| 2016/0269403 A1 | 9/2016 | Koutenaei et al. |
| 2016/0371686 A1 | 12/2016 | Metral |
| 2017/0007148 A1 | 1/2017 | Kaditz et al. |
| 2017/0032113 A1 | 2/2017 | Tunnell et al. |
| 2017/0039327 A1 | 2/2017 | Bitran et al. |
| 2017/0039336 A1 | 2/2017 | Bitran et al. |
| 2017/0041296 A1 | 2/2017 | Ford et al. |
| 2017/0109727 A1 | 4/2017 | Han et al. |
| 2017/0195477 A1 * | 7/2017 | Jones-McFadden ........................ G06Q 20/3224 |
| 2017/0200152 A1 | 7/2017 | Winkler et al. |
| 2017/0201518 A1 | 7/2017 | Holmqvist et al. |
| 2017/0262853 A1 | 9/2017 | Williamson et al. |
| 2017/0279795 A1 | 9/2017 | Redberg |
| 2018/0027411 A1 | 1/2018 | Taneja |
| 2018/0039990 A1 | 2/2018 | Lindemann |
| 2018/0041503 A1 | 2/2018 | Lindemann |
| 2018/0048472 A1 | 2/2018 | Pirrwitz et al. |
| 2018/0082304 A1 | 3/2018 | Summerlin et al. |
| 2018/0096333 A1 | 4/2018 | Studnicka et al. |
| 2019/0034911 A1 | 1/2019 | Wilson |
| 2019/0095990 A1 * | 3/2019 | Sarir .................. G06Q 20/3221 |
| 2019/0208029 A1 * | 7/2019 | Metral ................... G06Q 30/04 |
| 2019/0372959 A1 * | 12/2019 | Pattar .................... H04L 63/083 |
| 2019/0373219 A1 | 12/2019 | Sautner |
| 2020/0067907 A1 | 2/2020 | Avetisov et al. |
| 2020/0344624 A1 * | 10/2020 | Paterour ................. H04W 4/90 |
| 2020/0349580 A1 * | 11/2020 | Gerling-Ospina .......................... G06Q 20/3227 |
| 2021/0258308 A1 * | 8/2021 | Avetisov ............... H04L 9/0825 |
| 2022/0129904 A1 * | 4/2022 | Gerling-Ospina ... G06Q 20/354 |
| 2022/0255759 A1 | 8/2022 | Hurtado Tamayo |
| 2022/0309572 A1 * | 9/2022 | Sarir .................. G06Q 20/3221 |
| 2024/0354770 A1 * | 10/2024 | Gerling-Ospina ... G06Q 20/425 |

OTHER PUBLICATIONS

Push Notifications Explained, Airship; https://www.airship.com/resources/explainer/push-notifications-explained/#:~:text=A%20push%20notification%20is%20a,their%20devices%20to%20receive%20them; 8pgs.

\* cited by examiner

BIOMETRIC AUTHENTICATION ON PUSH NOTIFICATION

CROSS-REFERENCE TO RELATED APPLICATIONS

This application is a continuation of U.S. patent application Ser. No. 17/230,638, entitled "BIOMETRIC AUTHENTICATION ON PUSH NOTIFICATION," filed on Apr. 14, 2021, which is a continuation of U.S. patent application Ser. No. 15/277,768, entitled "BIOMETRIC AUTHENTICATION ON PUSH NOTIFICATION," filed on Sep. 27, 2016, both of which are herein incorporated by reference in their entireties for all purposes.

BACKGROUND

User authentication is implemented to ensure that a user is who they purport to be. For example, a user of a computing device can attempt to log into a back-end system. User authentication can be implemented to ensure that the user is authorized to log into the back-end system. In some examples, authentication can be achieved based on user credentials (e.g., username password). Biometric authentication enables users to be authenticated based on physical features that are unique to the user (e.g., facial features, voice). Biometric authentication is advantageous in that it is not easily spoofed, and that it does not require the user to remember credentials (e.g., username, password).

Authentication can be described as a workflow that is executed to enable a user to access data and/or applications on a computing device. That is, a user must perform an authentication process to gain access to data and/or applications. The authentication process can be inconvenient for the user, and can be resource burdensome (e.g., in terms of processor, memory, bandwidth, battery).

SUMMARY

This specification relates to enabling users to be authenticated transparently from a push-notification to a mobile computing device.

In general, innovative aspects of the subject matter described in this specification can be embodied in methods that include actions of transmitting push notification data to a computing device, the push notification data being processable by the computing device to display a push notification, receiving biometric data, the biometric data being provided from user input responsive to the push notification, determining that a user providing the user input is authenticated at least partially based on the biometric data, and inducing execution of a transaction in response to determining that the user is authenticated. Other implementations of this aspect include corresponding systems, apparatus, and computer programs, configured to perform the actions of the methods, encoded on computer storage devices.

These and other implementations can each optionally include one or more of the following features: the user input includes one or more of tactile input and verbal input; the biometric data includes one or more of fingerprint data, and voice data; actions further include receiving additional biometric data, wherein determining that the user is authenticated is further based on the additional biometric data; the additional biometric data is collected by the computing device in response to the user input; the transaction includes a financial transaction; and actions further include transmitting a notification for display to the user in response to determining that the use is authenticated and inducing execution of the transaction.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are directed to triggering biometric authentication on push notifications. More particularly, implementations of the present disclosure enable a user to authorize execution of a transaction (e.g., financial transaction) and be authenticated from a push notification without opening of and/or interacting with a mobile application on a user device. Implementations can include actions of transmitting push notification data to a computing device, the push notification data being processable by the computing device to display a push notification, receiving biometric data, the biometric data being provided from user input responsive to the push notification, determining that a user providing the user input is authenticated at least partially based on the biometric data, and inducing execution of a transaction in response to determining that the user is authenticated.

Implementations of the present disclosure will be described in further detail with reference to an example context. The example context includes a user utilizing one or more services of a service provider through an application executed on a mobile computing device. In some examples, a service enables the user to access secure data (e.g., a banking account, through which the user can access their financial information). It is contemplated, however, that implementations of the present disclosure can be used in any appropriate context (e.g., a user remotely logging into an account to access patient data in a healthcare context).

Figure 1:
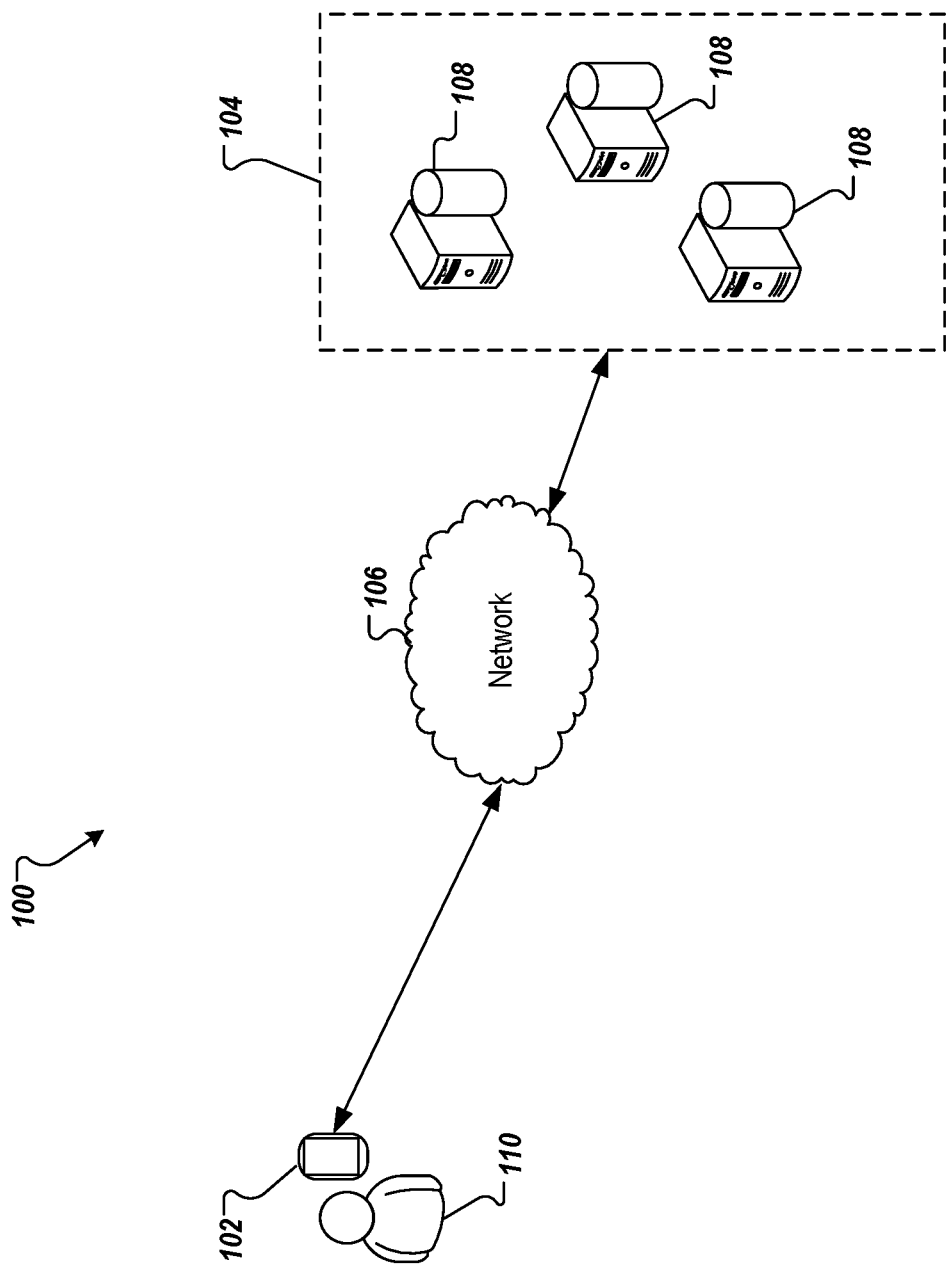
FIG. 1 depicts an example environment in accordance with implementations of the present disclosure.

FIG. 1 depicts an example environment 100, in which implementations of the present disclosure can be provided. In some examples, the example environment 100 enables a user to securely log into an account using a computing device. The example environment 100 includes a computing device 102, a back-end system 104, and a network 106. In some examples, the computing device 102 is used by a user 110 to log into and interact with the back-end system 104 over the network 106.

In the depicted example, the computing device 102 is provided as a smartphone. It is contemplated, however, that implementations of the present disclosure can be realized with any appropriate computing device (e.g., smartphone, tablet, laptop computer, voice enabled devices). In some examples, the network 106 includes a local area network (LAN), wide area network (WAN), the Internet, or a combination thereof, and connects web sites, user devices (e.g., computing device 102), and the back-end systems (e.g., back-end system 104). In some examples, the network 106 can be accessed over a wired and/or a wireless communications link. For example, mobile computing devices, such as smartphones can utilize a cellular network to access the network 106.

In the depicted example, the back-end system 104 includes at least one server system 108. In some examples, the at least one server system 108 hosts one or more computer-implemented services that users can interact with using computing devices. For example, the computing device 102 can be used to communicate with a service hosted by the back-end system 104 over the network 106. In some examples, the computing device 102 includes a computer-executable application executed thereon, which can be used to log into the service and establish a communication session between the computing device 102 and the back-end system 104. In some examples, the computing device 102 includes a web browser application executed thereon, which can be used to display one or more web pages of the service, the user interacting with the service through the web page(s).

In some implementations, the user can establish a user profile to access a service hosted by a back-end system. In some examples, the user profile includes user-specific information. Example user-specific information includes, without limitation, first name, last name, mailing address, email address and telephone number. In some examples, the user profile includes device-specific information that is unique to one or more computing devices that the user uses to access the service. For example, the device-specific information can include one or more unique identifiers (e.g., Internet Protocol (IP) addresses) assigned to respective devices that the user uses to access the service (e.g., laptop computer, tablet, smartphone).

In some implementations, the user profile further includes authentication information that can be used to authenticate the user. For example, the user profile can include, without limitation, a username, a password, and a personal identification number (PIN) (e.g., each selected by the user). In some examples, the user profile can include biometric data corresponding to one or more biometric authentication modalities. In some examples, the user requests the ability to be authenticated based on one or more biometric authentication modalities, and, for each biometric authentication form, can provide respective biometric data. Example biometric authentication modalities include, without limitation, facial recognition, voice recognition, fingerprint recognition, iris recognition, retina recognition, hand geometry recognition, and vein recognition. For example, the user can request authentication based on fingerprint, facial recognition, and/or voice recognition. Consequently, the user can provide (e.g., during an enrollment session) biometric data to enable fingerprint recognition (e.g., one or more images of the user's fingerprint(s)), facial recognition (e.g., one or more images of the user's face), and/or voice recognition (e.g., one or more voice samples). In some examples, the biometric data provided by the user is considered ground truth biometric data that subsequently received biometric data can be compared to in an attempt to authenticate the user.

In some implementations, after the user has established a user profile, the user can log into the service that is hosted by the back-end system. For example, the user can use a computing device to provide user credentials (e.g., username, password), which can be used by the back-end service to perform a primary authentication. For example, a request can be sent from the computing device of the user to the back-end system (e.g., over a network), the request including the credentials. If the credentials that the user provides match credentials that the back-end service has stored, the user is determined to be primarily authenticated, and is able to access the service. That is, for example, a secure session is established between the computing device of the user and the back-end system (e.g., using secure sockets layer (SSL), transport layer security (TSL)). In this manner, data that is communicated between the computing device and the back-end system is encrypted for transmission.

In some examples, the primary authentication is further based on a unique identifier of and/or a token stored on the computing device that the user is using to access the back-end system. For example, a request can be sent from the computing device of the user to the back-end system (e.g., over a network), the request including the credentials and the unique identifier of and/or the token stored on the computing device. If the credentials match credentials that the back-end service has stored, and the unique identifier matches a unique identifier associated with the user profile stored at the back-end system and/or the token is determined to be authentic, the user is determined to be primarily authenticated, and is able to access the service.

As introduced above, implementations of the present disclosure are generally directed to triggering biometric authentication on push notifications. More particularly, implementations of the present disclosure enable a user to authorize execution of a transaction (e.g., financial transaction) and be authenticated from a push notification without opening of and/or interacting with a mobile application on a user device.

In some implementations, a push notification can be transmitted to a user. A push notification can be described as a visual, tactile, and/or audible notification provided on a user device initiated by a server-side system. A push notification can be associated with a mobile application that is installed on, and executed by the user device, and can be provided without the mobile application actually running on the user device. In other words, the user of the user device need not have the mobile application open for a push notification associated with the mobile application to be provided on the user device.

In some examples, a back-end system (e.g., the back-end system 104 of FIG. 1) can transmit a push notification to a mobile device (e.g., the computing device 102 of FIG. 1) of the user. In some examples, the push notification is transmitted in response to a scheduled transaction. For example, the user may be scheduled to pay a bill (e.g., mortgage, car loan, credit card, utility bill, etc.), and the back-end system can transmit the push notification to alert the user to the bill, and request whether the user would like to pay the bill. For example, the push notification can be displayed on a display of the mobile device as a graphical representation and can include information regarding the transaction and one or more user interface (UI) elements. For example, the push notification can indicate an entity that is to be paid, an amount of payment, and a due date. In some examples, the push notification can include a first UI element (e.g., button) that can be selected by the user to initiate a more detailed review of the transaction, and a second UI element (e.g., button) that can be selected by the user to authorize and execute the transaction.

In some examples, user input is received to the push notification, and is indicative of a user intent. The user input can be provided in one or more modalities (e.g., tactile—the user touches the display; voice—the user speaks a voice command). For example, if the user input indicates a swipe gesture across the push notification, the push notification can be cleared from the display, and no action taken with regard to the transaction (e.g., user intent is to clear the push notification from the display). As another example, if the user input indicates selection of the first UI element, additional information regarding the transaction can be displayed to the user (e.g., user intent is to view additional information directly within the push notification). In some examples, the push notification can be expanded to provide an expanded push notification, which displays the additional information, as well as a third UI element. In some examples, in response to user selection of the third UI element, the push notification is cleared, and a mobile application is launched (e.g., a user interface is opened to unlock the mobile device, if locked, a log-in screen to the mobile application is displayed for the user to log into the mobile application, etc.).

If the user input indicates selection of the second UI element (e.g., from the push notification, from the expanded push notification), biometric authentication of the user is initiated. In some implementations, biometric authentication can include one or more biometric modalities. Example biometric modalities can include, without limitation, fingerprint recognition, voice recognition, and facial recognition. In some implementations, biometric authentication can be conducted based on the user input already received. That is, a subsequent biometric authentication interface need not be displayed in response to the user input, and, instead, the user input itself is used as biometric data for biometric authentication. For example, if the user selects the second UI element by touch, biometric data indicative of the user's fingerprint can be captured, which biometric data can be used to authenticate the user. As another example, if the user selects the second UI element by voice command, biometric data indicative of the user's voice can be captured, which biometric data can be used to authenticate the user.

In some implementations, in response to user selection of the third UI element, an authentication screen can be displayed to the user. In some examples, if the user's mobile device is locked, the authentication screen can be displayed without requiring the user to first unlock the mobile device (e.g., input swipe pattern and/or PIN). In some examples, the authentication screen enables the user to select a biometric authentication mode. In some examples, the authentication screen corresponds to a default biometric authentication mode. In some implementations, the user interacts with the authentication screen to provide biometric data. For example, if the authentication screen corresponds to facial recognition (or facial recognition is selected by the user), the user can interact with the authentication screen, and the mobile device, to capture one or more images of the user's face, which one or more images are provided as biometric data.

In some implementations, the biometric data is transmitted to the back-end system, which processes the biometric data to authenticate the user (e.g., compares the received biometric data to ground truth biometric data associated with the user). If the user cannot be authenticated based on the biometric data, a notification can be transmitted and displayed to the user. If the user is authenticated based on the biometric data, the transaction can be (or can be scheduled to be) executed (e.g., funds transferred from the user's account to a payee account), and a notification can be transmitted to the user indicating that the transaction was (or will be) executed.

Accordingly, implementations of the present disclosure provide a streamlined interaction between a user and a mobile device to enable execution of a transaction from a push notification, while still biometrically authenticating the user. In this manner, the user is not required to unlock the mobile device, launch a mobile application, and/or interact with the mobile application to authorize and/or be authenticated for a transaction. One or more technical advantages are achieved. For example, resources (e.g., processing, memory, battery) are conserved by avoiding unlocking the mobile device, launching a mobile application, and/or interacting with the mobile application. This provides a significant advantage in resource-constrained devices, and can enable, for example, extended battery life of the mobile device.

FIGS. 2A-2E depict screenshots that can be provided in accordance with implementations of the present disclosure. The example screenshots correspond to the example context, which includes the user using a mobile application of a financial service, through which the user is able to access financial data (e.g., bank accounts, investments), transfer or deposit assets, and/or pay bills.

Figure 2B:
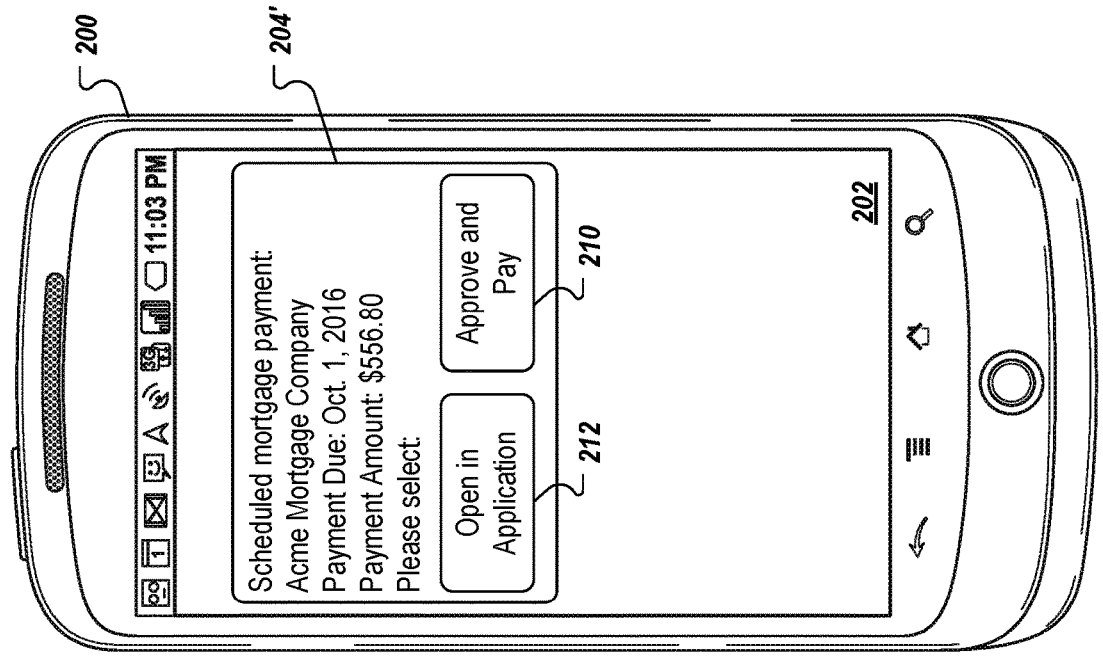
FIGS. 2A-2E depict screenshots that can be provided in implementations of the present disclosure.
Figure 2A:
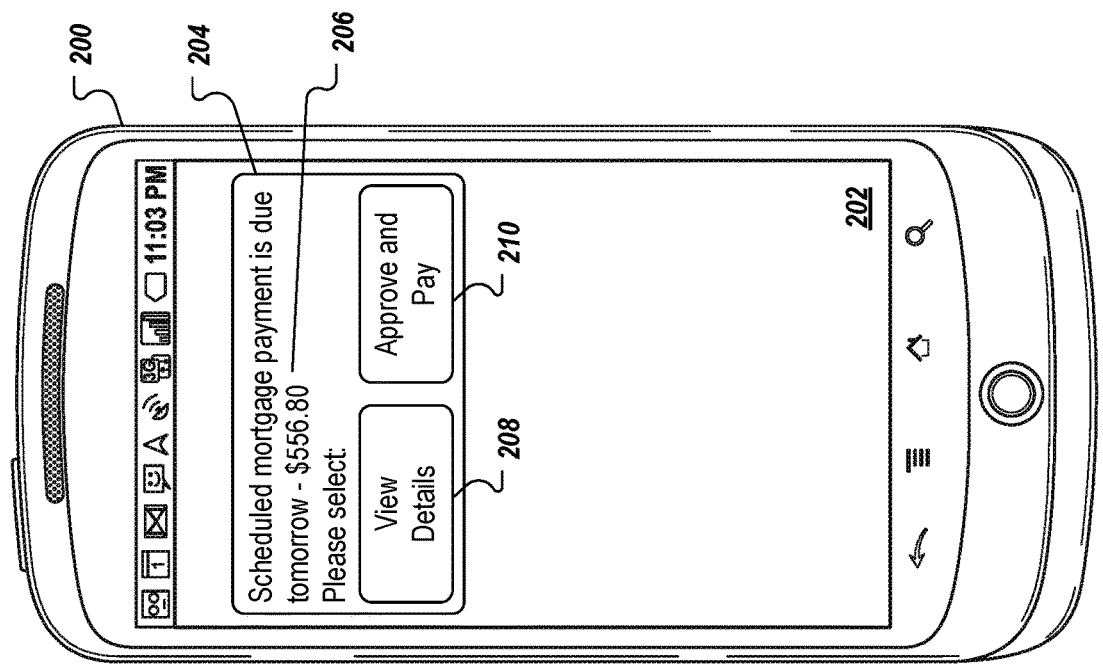

FIG. 2A depicts an example computing device 200 (e.g., a smartphone) with a display screen 202. In some examples, the computing device 200 has installed on, and can execute a mobile application associated with a service provider. For example, the user can use the computing device 200 to log into a service provided by a back-end system through the mobile application.

In the depicted example, the display screen 202 includes push notification 204. In the example context, the push notification 204 is associated with a scheduled transaction. The push notification 204 includes text 206, a first UI element 208 (e.g., button), and a second UI element 210 (e.g., button). In some examples, the text 206 provides summary information regarding the scheduled payment. In some implementations, a user of the computing device 200 can clear the push notification 204 using a gesture. For example, the user can contact the display 202 in an area displaying the push notification 204, and can perform a swipe gesture (e.g., swipe right, swipe left) to clear the push notification 204 from the display 202.

In some implementations, the first UI element 208 can be selected to view further detail regarding the scheduled transaction. In some implementations, the second UI element 210 can be selected to approve the scheduled transaction directly from the push notification 204, as described in further detail herein. In some examples, a UI element can be selected based on tactile user input, or audible user input. For example, the user can select a UI element by contacting the UI element (e.g., clicking on, tapping). As another example, the user can select a UI element by stating a phrase (e.g., "View Details," "Approve and Pay"). In some examples, speech of the user is captured (e.g., by a microphone of the computing device 200), is recorded as digital data (e.g., in a computer-readable file), which can be processed to recognize the speech (e.g., speech-to-text).

In some implementations, and as described in further detail herein, user input indicating selection of the first UI 208 (e.g., tactile user input, verbal user input) results in expansion of the push notification to provide additional detail. FIG. 2B depicts the example computing device 200 (e.g., a smartphone) with the display screen 202 displaying an expanded push notification 204'. In the depicted example, the expanded push notification 204' includes additional information regarding the subject transaction, and also includes the second UI element 210, and a third UI element 212. In some implementations, the third UI element 212 can be selected to open the application installed on the computing device 200 to view the transaction. In some implementations, the second UI element 210 can be selected to approve the scheduled transaction directly from the expanded push notification 204', as described in further detail herein.

In some implementations, user input indicating selection of the second UI element 210 (e.g., tactile user input, verbal user input) results in transparent biometric authentication of the user. In some examples, transparent indicates that biometric authentication is at least attempted without requiring the user to interact with another interface (examples of which are described in further detail herein). In some examples, transparent biometric authentication indicates that biometric authentication is at least attempted without requiring the application to be opened on the computing device 200 for interaction by the user. For example, and as introduced above, the user can select the second UI element 210 by contacting the second UI element 210 (e.g., clicking on, tapping). As another example, the user can select the second UI element 210 by stating a phrase (e.g., "Approve and Pay"). In some examples, speech of the user is captured (e.g., by a microphone of the computing device 200), is recorded as digital data (e.g., in a computer-readable file), which can be processed to recognize the speech (e.g., speech-to-text).

In some implementations, transparent biometric authentication can be performed based on the user input. In some examples, the user input can be processed to provide biometric data that can be used to authenticate the user. For example, if the user selects the second UI element 210 (e.g., from the push notification 204, or the expanded push notification 204') based on tactile user input, contact of the user is captured (e.g., by the display screen 202), is recorded as digital data (e.g., in a computer-readable file), and is processed to recognize a fingerprint of the user. In this example, the user's fingerprint is provided as the biometric data. As another example, if the user selects the second UI element 210 (e.g., from the push notification 204, or the expanded push notification 204') based on verbal user input (e.g., by stating the phrase "Approve and Pay"), speech of the user is captured (e.g., by a microphone of the computing device 200), is recorded as digital data (e.g., in a computer-readable file), which can be processed to provide a voice signature of the user. In this example, the user's voice signature is provided as the biometric data.

In some implementations, the biometric data (e.g., fingerprint, voice signature) can be transmitted to a back-end system (e.g., the back-end system 104 of FIG. 1) as a digital file (e.g., a digital file recording data representative of the fingerprint, or voice signature). In some implementations, the back-end system compares the biometric data to ground truth biometric data associated with the user to provide an authentication result. In some examples, the authentication result indicates that the user has been authenticated based on the biometric data. In some examples, the authentication result indicates that the user has not been authenticated based on the biometric data. In some implementations, the authentication result is transmitted to the computing device 200, which displays a respective notification, as described in further detail herein.

Figure 2D:
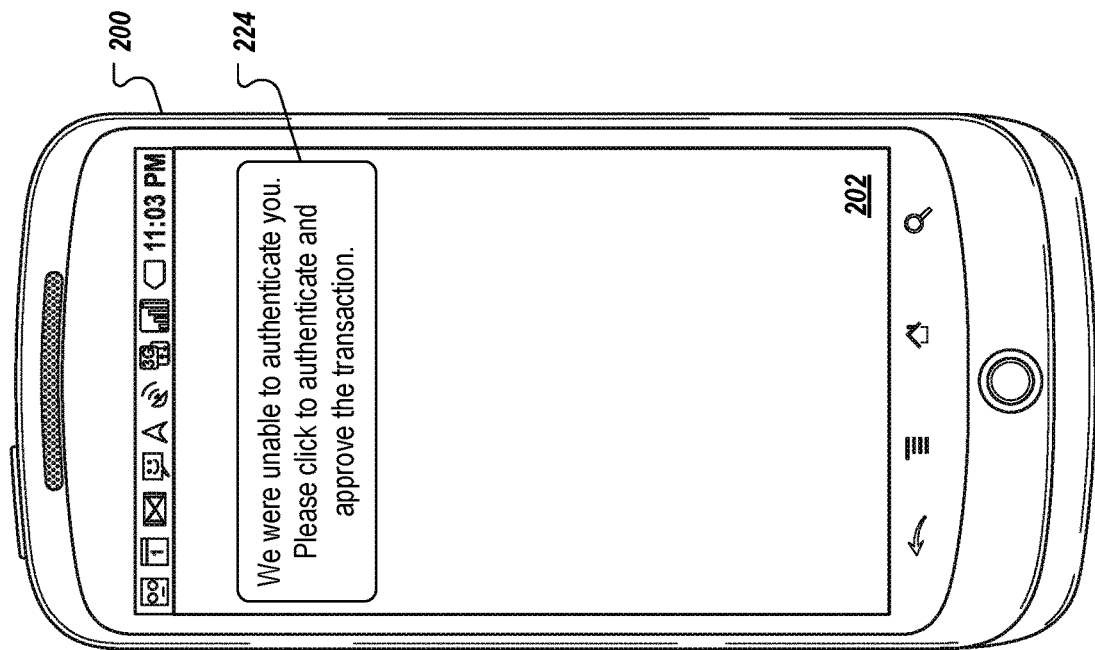
Figure 2C:
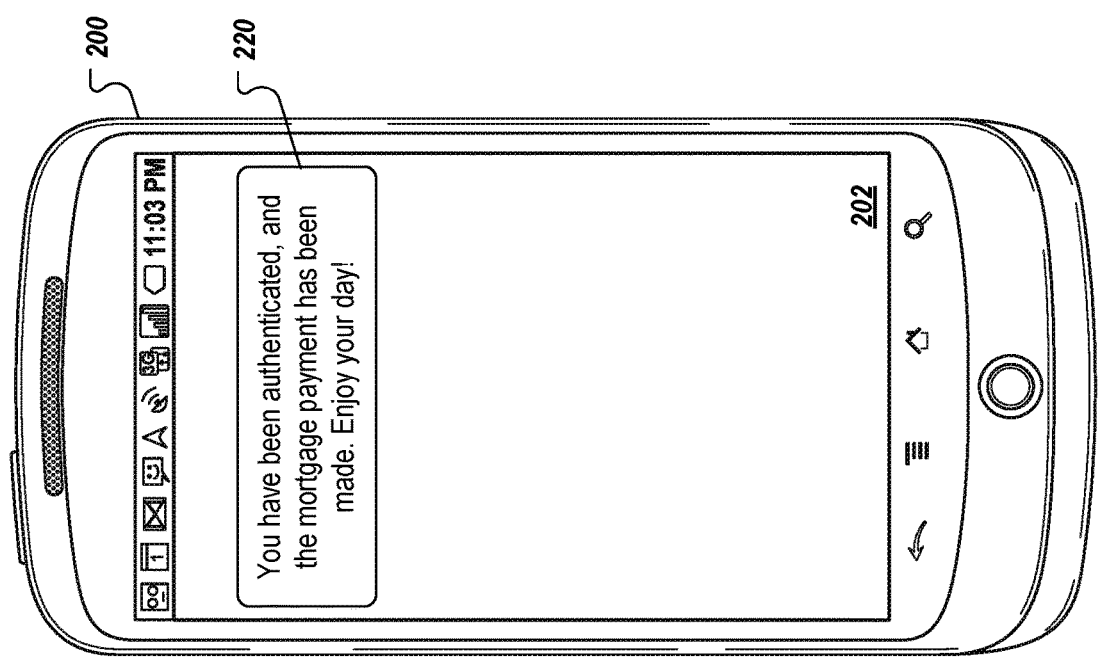

In some examples, if the authentication result indicates that the user has been authenticated based on the biometric data, the transaction is performed. For example, the back-end system 104 executes (or triggers execution of) the transaction (e.g., payment of the bill). In some examples, a result notification is provided to the user. FIG. 2C depicts the example computing device 200 (e.g., a smartphone) with the display screen 202 displaying a result notification 220.

In some examples, if the authentication result indicates that the user has not been authenticated based on the biometric data, the transaction is not executed in response to the user input. In some examples, a notification can be provided to the user indicating that the user was unable to be authenticated. FIG. 2D depicts the example computing device 200 (e.g., a smartphone) with the display screen 202 displaying an example notification 224. In some examples, the user can trigger an authentication workflow from the notification 224 (e.g., selecting the notification 224). In some examples, the authentication workflow can include opening the application on the computing device 200 and conducting non-biometric authentication of the user (e.g., username, password, PIN), and/or biometric authentication of the user (e.g., fingerprint, voice, facial) through one or more user interfaces displayed on the computing device 200.

Figure 2E:
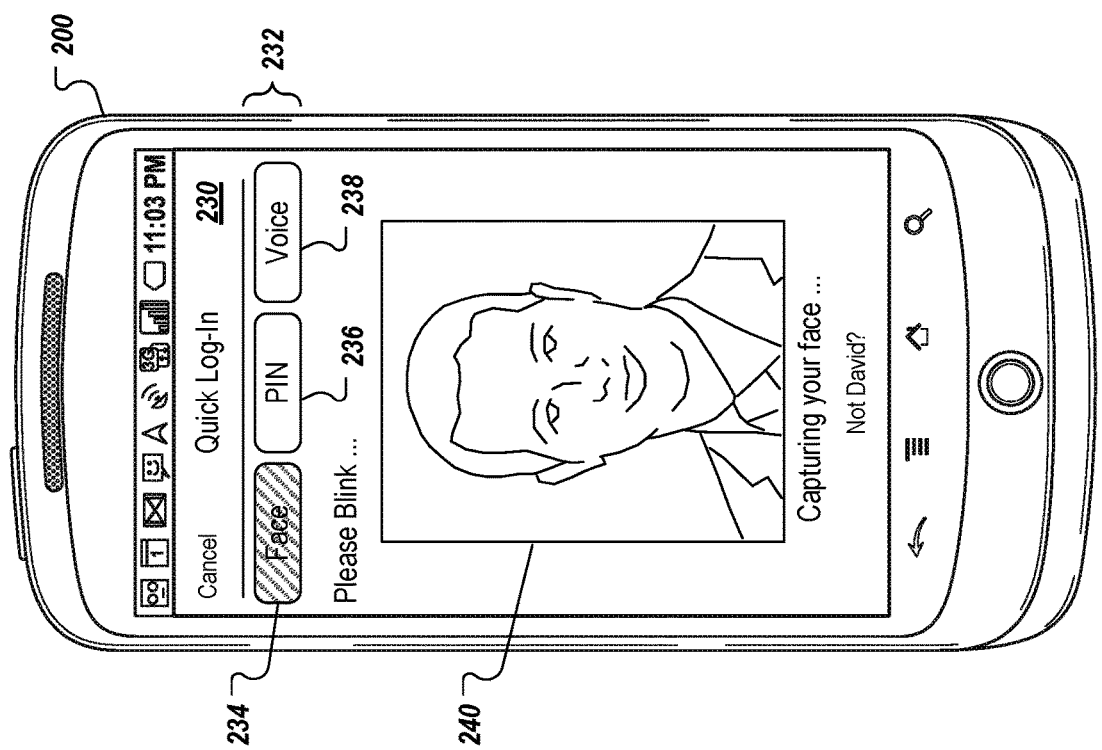

FIG. 2E depicts the example computing device 200 (e.g., a smartphone) with the display screen 202 displaying an example authentication screen 230. For example, the authentication screen 230 can be displayed in response to determining that the user cannot be authenticated based on the biometric data provided from the push notification, or user selection of a UI element to execute the authentication workflow. The example authentication screen 230 includes a menu 232 of available authentication modalities. In the depicted example, the menu 232 includes a plurality of user-selectable elements 234, 236, 238 (e.g., button elements). In the depicted example, the authentication modalities include facial recognition, PIN, and voice recognition. For example, it can be determined that the user (e.g., David) has the authentication modalities facial recognition, PIN, and voice recognition established in his user profile. The user-selectable element 234 corresponds to facial recognition, the user-selectable element 236 corresponds to PIN, and the user-selectable element 238 corresponds to voice recognition. In the example of FIG. 2D, the user-selectable element 234 is selected, indicating that the authentication is to be performed using facial recognition.

In some implementations, and as described herein, transparent biometric authentication can be performed based on the user input, where the user input can be processed to provide biometric data that can be used to authenticate the user. In some implementations, additional biometric data can be captured at the time that the user provides the user input. For example, and referring again to FIG. 2A or 2B, if the user selects the second UI element 210 based on tactile user input, contact of the user is captured (e.g., by the display screen 202), is recorded as digital data (e.g., in a computer-readable file), and is processed to recognize a fingerprint of the user. In this example, the user's fingerprint is provided as the biometric data. As another example, if the user selects the second UI element 210 (e.g., from the push notification 204, or the expanded push notification 204') based on verbal user input (e.g., by stating the phrase "Approve and Pay"), speech of the user is captured (e.g., by a microphone of the computing device 200), is recorded as digital data (e.g., in a computer-readable file), which can be processed to provide a voice signature of the user. In this example, the user's voice signature is provided as the biometric data.

In some implementations, in response to user selection (e.g., tactile, verbal) of the second UI element, the computing device 200 captures additional biometric data. In some examples, facial data can be provided as additional biometric data. For example, in response to user selection of the second UI element 210, the computing device 200 captures an image (e.g., using a camera of the computing device 200). In some examples, the image can be processed to determine whether a face is present in the image. In some examples, if a face is not present in the image, facial data is not provided as additional biometric data. In some examples, if a face is present in the image, the image can be processed to provide facial data, which is provided as additional biometric data. In some examples, the image can be processed by the computing device 200 to determine whether a face is present and/or to provide facial data. In some examples, the computing device 200 can provide the image to the back-end system, and the back-end system determines whether a face is present and/or provides facial data.

As another example, heartbeat data can be provided as additional biometric data. For example, in response to user selection of the second UI element 210, the computing device 200 captures heartbeat data (e.g., using a heartrate monitor of the computing device 200; the computing device 200 receiving heartbeat data from a wearable device that the user is wearing and that is in communication with the computing device 200). In some examples, the heartbeat data can be processed to provide a heartbeat profile, which is provided as additional biometric data. In some examples, the heartbeat data can be processed by the computing device 200 to provide the heartbeat profile. In some examples, the computing device 200 can provide the heartbeat data to the back-end system, and the back-end system provides the heartbeat profile.

In some implementations, if additional biometric data is provided the user can be authenticated based on the biometric data (e.g., captured based on the user input to the push-notification) and the additional biometric data.

In some implementations, the biometric data is provided to an authentication service, which processes the biometric data to authenticate the user, and provide the authentication result. In some examples, the authentication service determines a score that represents a similarity between the biometric data and respective ground truth biometric data. For example, the score can range between 0 and 1, a 0 indicating that the biometric data and the respective ground truth biometric data are wholly dissimilar, and a 1 indicating that the biometric data and the respective ground truth biometric data are identical. In some examples, a threshold score (e.g., 0.8) is provided, against which the score is compared. In some examples, if the score exceeds the threshold score, the biometric data is determined to be sufficiently similar to the ground truth biometric data to authenticate the user. In some examples, if the score does not exceed the threshold score, the biometric data is determined to be insufficiently similar to the ground truth biometric data to authenticate the user.

In some implementations, the biometric data and the additional biometric data are provided to the authentication service, which processes the biometric data and the additional biometric data to authenticate the user, and provide the authentication result. In some examples, the authentication service determines respective scores that represent a similarity between the biometric data and the additional biometric data to their respective ground truth biometric data. In some examples, the authentication service authenticates the user based on the respective scores. For example, the authentication service can determine that the user is authentic, if at least one of the scores exceeds a respective threshold score. As another example, the authentication service can determine that the user is authentic, only if both scores exceed a respective threshold score. As another example, the authentication service can combine the scores (e.g., average, weighted average) to provide a combined score, and can determine that the user is authentic, if the combined score exceeds a respective threshold score.

Figure 3:
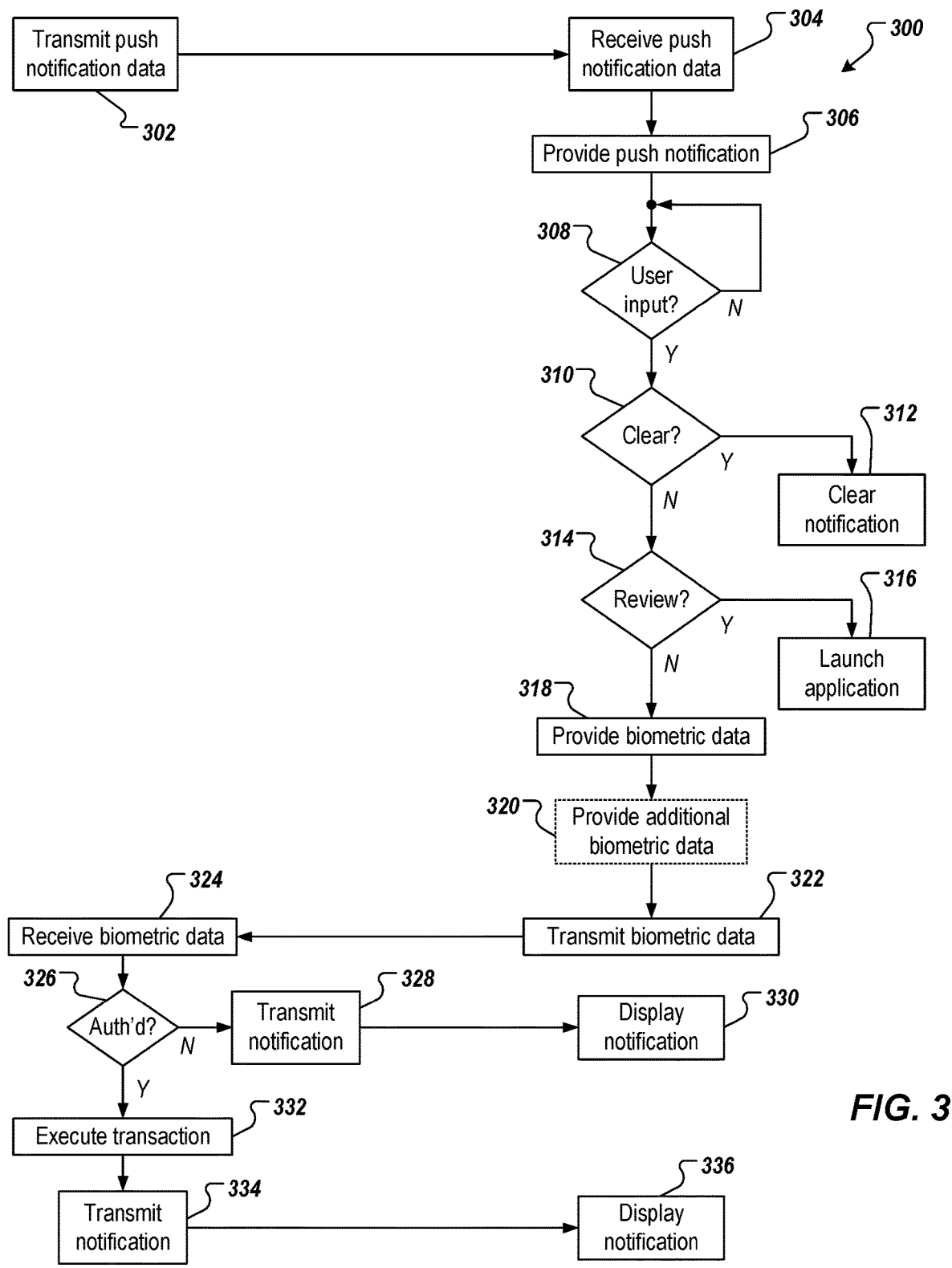
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1. In some examples, the example process 300 can be provided by one or more computer-executable programs executed using one or more computing devices. For example, the example process 300, or portions thereof, can be provided by one or more programs executed on a computing device 102 and/or a server system 108 of FIG. 1.

Push notification data is transmitted (302). For example, a back-end system (e.g., the back-end system 104 of FIG. 1) transmits push notification data to a computing device (e.g., the computing device 102 of FIG. 1). In some examples, the push notification data is transmitted in response to determining that a transaction is due to be executed within a threshold period of time (e.g., minute(s), hour(s), day(s), week(s), month(s), year(s)). The push notification data is received (304). For example, a computing device (e.g., the computing device 102 of FIG. 1, the computing device 200 of FIGS. 2A-2E) receives the push notification data (e.g., as computer-readable data). A push notification is provided (306). For example, the computing device processes the push notification data to display a push notification on a display of the computing device (see, e.g., FIG. 2A).

It is determined whether user input is received (308). For example, the computing device determines whether user input (e.g., tactile, verbal) is provided to the computing device, and is associated with the push notification. If user input is not received (and/or is not associated with the push notification), the example process 300 lops back. If user input is received (and is associated with the push notification), it is determined whether the user input indicates that the push notification is to be cleared (310). For example, it can be determined that the user input includes a swipe gesture across the push notification, indicating that the push notification is to be cleared. If the push notification is to be cleared, the push notification is cleared (312). If the push notification is not to be cleared, it is determined whether the user input indicates a request for further review of the transaction underlying the push notification (314). For example, the user input can indicate selection of a UI element requesting detailed review of the transaction. If further review of the transaction underlying the push notification is requested, an application is launched (316). For example, an application that enables the user to interact with the back-end system through one or more interfaces is launched on the computing device.

If further review of the transaction underlying the push notification is not requested, it is determined that the user input indicates a request to execute the underlying transaction. Consequently, the biometric data is provided (318). In some examples, the biometric data (e.g., image, audio) is provided based on the user input (e.g., verbal, tactile), as described herein. In some examples, additional biometric data is provided (320). The biometric data (and additional biometric data, if any) is transmitted (322). For example, the computing device transmits the biometric data (and additional biometric data, if any) to the back-end system.

The biometric data (and additional biometric data, if any) is received (324). For example, the back-end system receives the biometric data (and additional biometric data, if any) from the computing device. It is determined whether the user is authenticated (326). For example, the biometric data (and additional biometric data, if any) is provided to an authentication service, which processes the biometric data (and additional biometric data, if any) to provide an authentication result. The authentication result indicates whether the user is authenticated. If the user is not authenticated, a notification is transmitted (328). For example, the notification is transmitted from the back-end system to the computing device. The notification is displayed (330) (see, e.g., FIG. 2D). If the user is authenticated, the underlying transaction is executed (or approved to be executed at a later time) (332), a notification is transmitted (334), and the notification is displayed (336) (see, e.g., FIG. 2C).

As discussed herein, implementations of the present disclosure enable a streamlined interaction between a user and a mobile device to enable execution (approval of execution) of a transaction from a push notification, while still biometrically authenticating the user. In this manner, the user is not required to unlock the mobile device, launch a mobile application, and/or interact with the mobile application to authorize and/or be authenticated for a transaction. One or more technical advantages are achieved. For example, resources (e.g., processing, memory, battery) are conserved by avoiding unlocking the mobile device, launching a mobile application, and/or interacting with the mobile application. This provides a significant advantage in resource-constrained devices, and can enable, for example, extended battery life of the mobile device.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method executed by processing circuitry, the method comprising:
    transmitting, by the processing circuitry in response to initiation of a transaction, push notification data to a computing device while a mobile application of a financial service on the computing device is not open, wherein:
        the mobile application is configured to receive user authorization to authorize the transaction while the mobile application is open;
        the push notification data is configured to cause the computing device to display a push notification on an electronic display of the computing device; and
        the push notification, when displayed on the electronic display, comprises a user interface (UI) element configured to receive an input associated with an approval of the transaction, wherein the input is received via a user interaction with the push notification on the computing device and without opening the mobile application;
    receiving, by processing circuitry, biometric data collected during the user interaction with the push notification;
    receiving, by the processing circuitry, heartbeat data from a wearable device different from the computing device in response to receiving the input;
    determining, by the processing circuitry, that a user providing the input is authenticated at least partially based on the biometric data and the heartbeat data;
    inducing, by processing circuitry, execution of the transaction in response to determining that the user is authenticated; and
    transmitting, by the processing circuitry, a notification of the transaction being executed to the computing device.

2. The method of claim 1, wherein the input comprises a tactile input or a verbal input.

3. The method of claim 2, wherein:
    the input comprises the tactile input; and
    the biometric data comprises fingerprint data.

4. The method of claim 2, wherein:
    the input comprises the verbal input; and
    the biometric data comprises voice data.

5. The method of claim 1, wherein the computing device is configured to generate a visualization for display via the electronic display based on the notification of the transaction being executed, wherein the visualization comprises an indication that the user is authenticated, the transaction is executed, or both.

6. The method of claim 1, wherein the heartbeat data is collected from the wearable device by the computing device in response to receiving the input.

7. The method of claim 1, wherein the transaction comprises a financial transaction.

8. The method of claim 1, wherein, when displayed on the electronic display, the push notification comprises a second UI element configured to activate the mobile application to view the transaction.

9. A system comprising:

a data store for storing data; and processing circuitry configured to execute computer-readable instructions to perform operations comprising:

transmitting, in response to initiation of a transaction, push notification data to a computing device while a mobile application of a financial service on the computing device is not open, wherein:

the mobile application is configured to receive user authorization to authorize the transaction while the mobile application is open;

the push notification data is configured to cause the computing device to display a push notification on an electronic display of the computing device; and the push notification, when displayed on the electronic display, comprises a user interface (UI) element configured to receive an input associated with an approval of the transaction, wherein the input is received via a user interaction with the push notification on the computing device and without opening the mobile application;

receiving biometric data collected during the user interaction with the push notification;

receiving heartbeat data collected from a wearable device different from the processing circuitry in response to receiving the input;

determining that a user providing the input is authenticated at least partially based on the biometric data and the heartbeat data;

inducing execution of the transaction in response to determining that the user is authenticated; and transmitting a notification of the transaction being executed to the computing device.

10. The system of claim 9, wherein the push notification comprises a second UI element configured to activate the mobile application to view the transaction when the push notification is displayed on the electronic display.

11. The system of claim 9, wherein the operations further comprise receiving additional biometric data, wherein the user is authenticated based on the additional biometric data.

12. The system of claim 11, wherein the additional biometric data is collected by the computing device after the computing device acquires the input.

13. The system of claim 11, wherein:

the biometric data comprises fingerprint data or voice data; and the additional biometric data comprises facial data or heartbeat data.

14. A non-transitory computer-readable storage medium coupled to one or more processors and having instructions stored thereon that, when executed by the processing circuitry, cause the processing circuitry to perform operations comprising:

transmitting, in response to initiation of a transaction, push notification data to a computing device while a mobile application of a financial service on the computing device is not open, wherein:

the mobile application is configured to receive user authorization to authorize the transaction while the mobile application is open;

the push notification data is configured to cause the computing device to display a push notification on an electronic display of the computing device; and the push notification, when displayed on the electronic display, comprises a user interface (UI) element configured to receive an input associated with an approval of the transaction, wherein the input is received via a user interaction with the push notification on the computing device and without opening the mobile application;

receiving biometric data collected during the user interaction with the push notification;

receiving heartbeat data collected from a wearable device different from the processing circuitry in response to receiving the input;

determining that a user providing the input is authenticated at least partially based on the biometric data comprising the heartbeat data;

inducing execution of the transaction in response to determining that the user is authenticated; and transmitting a notification of the transaction being executed to the computing device.

15. The non-transitory computer-readable storage medium of claim 14, wherein the operations further comprise receiving additional biometric data, wherein determining that the user is authenticated is further based on the additional biometric data.

16. The non-transitory computer-readable storage medium of claim 15, wherein the additional biometric data comprises facial data.

17. The non-transitory computer-readable storage medium of claim 15, wherein determining that the user providing the input is authenticated comprises:

determining a first score associated with a first similarity between the biometric data and a first ground truth associated with the user;

determining a second score associated with a similarity between the additional biometric data and a second ground truth associated with the user;

combining the first score and the second score to determine a combined score; and determining that the user is authenticated in response to the combined score exceeding a threshold.

18. The non-transitory computer-readable storage medium of claim 14, wherein:

the input comprises a tactile input or a verbal input; and the biometric data comprises fingerprint data or voice data.

* * * * *